United States Patent [19]

Peot

[11] Patent Number: 4,777,393

[45] Date of Patent: Oct. 11, 1988

[54] MODULAR TOOL SYSTEM SWITCH AND ACTUATOR ASSEMBLY

[75] Inventor: David G. Peot, Easley, S.C.

[73] Assignee: The Singer Company, Stamford, Conn.

[21] Appl. No.: 75,005

[22] Filed: Jul. 17, 1987

[51] Int. Cl.[4] .......................... H02K 7/14; H02K 5/08

[52] U.S. Cl. ........................................ 310/50; 310/89; 310/68 A

[58] Field of Search .............................. 29/560; 74/16; 51/170 R, 170 PT; 310/50, 89, 47, 68 A, 69, 89; 320/2, 15; 408/20, 24, 25, 26

[56] References Cited

U.S. PATENT DOCUMENTS 4,591,777 5/1986 McCarty et al. ..................... 310/50
4,647,831 3/1987 O'Malley et al. ..................... 310/50

*Primary Examiner*—Patrick R. Salce
*Assistant Examiner*—D. L. Rebsch
*Attorney, Agent, or Firm*—David L. Davis

[57] ABSTRACT

A modular tool assembly includes a single motor unit and a plurality of toolheads. The housings for the various toolheads include different engaging structures for engaging combinations of control switches of the motor unit, thereby providing different operating characteristics to the various tools formed by engagement of the motor unit and the toolheads. A direction reversing switch of the motor unit is placed in a fixed position by some of the toolheads and is left in a controllable condition by others. An on/off switch is provided in the motor unit, as is an on/off and speed control switch. The various toolheads include engaging means for engaging one or the other of the control switches, thus providing fixed speed or variable speed, fixed direction or reversible direction, for operation of a plurality of tools utilizing a single motor unit.

20 Claims, 7 Drawing Sheets

MODULAR TOOL SYSTEM SWITCH AND ACTUATOR ASSEMBLY

TECHNICAL FIELD

This invention relates to electrically driven tools, and more specifically to a modular arrangement wherein a single motor in a self contained housing is mechanically engagable in any of a plurality of toolheads, each toolhead including a different mechancial structure, for performing a different work function, and wherein each toolhead housing includes different structure for biasing and engaging a plurality of switches on the motor in order to vary operating characterisitics of the motor.

BACKGROUND OF THE INVENTION

Electrically driven tools are well known. Thus, tools such as drills, sabre saws, orbital sanders and the like typically include in a single housing both a motor and a mechanical apparatus driven thereby. In an electric drill the driven apparatus may include a gearing arrangement for rotatably driving a gear chuck engaging a drill bit. The housing for such an arrangement typically provides a handle and a motor control. Such electrically operated drills may include a first switch, for operating the motor in one or another direction, and a second switch, such as a trigger, for turning the motor on and off, as well as varying the operating speed of the motor.

A tool designed to operate as a sabre saw typically includes a differently shaped housing to accommodate the different orientation of the tool when being used and the different requirements for handling and manipulating the tool. A control arrrangement typically provided for a sabre saw is an on/off switch. Additionally, there may be provided a speed control for the motor. Alternatively, there may be provided an on/off switch with a plurality of positions for controlling the operating speed of the sabre saw. However, in view of the unidirectional cutting operation of a sabre saw, reversal of the operating direction of the saw is to be avoided. Accordingly, sabre saws are not provided with reversing switches for the motor.

Another tool arrangement, including a specialized housing design therefor, is found in an orbital sander. Such a tool includes gearing arrangement for converting rotary motion of the output shaft of the motor to orbital motion of a sanding pad. Such tools typically have but a single switch operable in only two positions, to turn the driving motor on and off. Neither speed variation nor direction reversal are provided and are to be avoided.

Thus, it is seen that different tools of the prior art require different switching arrangements and different control switches for proper operation. Prior art tool structures provide internal wiring arrangements in the driving motors to provide variable or fixed speed and direction of rotation. Accordingly, prior art tool designs have been unable to provide a single arrangement wherein a single motor is operable as a fixed speed, fixed direction motor with one tool, a variable speed and variable direction motor with another tool, and as a variable speed fixed direction motor with yet a third tool. Such designs have thus resulted in wasteful expense by providing a separate motor with each tool since a single motor could not be provided which responded to different control switches and arrangements thereof required by different tools and which operated in one fashion with one tool and in another fashion with another tool. Because of such an inability to provide a single structure which is usuable with a plurality of tools, individual consumers have been required to purchase a plurality of motors for a plurality of tools, even though a home consumer is unlikely to be using more than one tool and one motor at one time.

The prior act has thus been deficient in failing to provide an arrangement wherein a single motor, when combined with different toolheads, operates with different characteristics, and is protected from erroneous user operation.

SUMMARY OF THE INVENTION

It is accordingly an object of the present invention to overcome the difficulties of the prior art and to provide a modular tool system wherein a single motor module is engagable with any of a plurality of toolheads, and wherein the different combinations of the motor with different toolheads exhibit different operating characteristics.

It is a more specific object of the invention to provide a motor module having a plurality of control switches, together with a plurality of toolheads each including a different arrangement of engaging means for engaging the motor control switches, thereby to activate, bias, preset and disable different combinations of the control switches in order to provide different control characteristics to the motor module when engaged in the different toolhead housings.

In is yet another object of the invention to provide a motor module including at least two of a first switch operable for turning the motor module on and off, a second switch operable for turning the motor module on and off and for varying operating speed of the motor, and a third switch operable for selecting a direction of rotation of the motor, and a further to provide individual toolheads including engaging, guiding and/or biasing means for different combinations of the three control switches in order to provide tools which are operable in on/off modes only, in on/off and variable speed modes, or in reversible direction modes, or in any combination thereof.

Still another object of the invention is the provision of a motor module with a control switch, and a toolhead housing having a cam engaging the control switch in order to set the motor to a predetermined mode of operation upon engagement of the motor module and the toolhead housing.

In accordance with these and other objects of the invention, there is provided a motor driven tool assembly including a self contained electric motor unit encased in a housing. A rotatable output shaft of the motor unit provides output power, and a plurality of control switches are provided for control of the motor. In accordance with one embodiment of the invention there are provided at least a first switch for turning the motor on and off and a second switch for controlling direction of rotation of the output shaft of the motor. A plurality of separate toolheads are separately engagable with the motor unit. Each of the toolheads includes a driven input member and a coupling for coupling the member to the output shaft of the motor. The toolheads further each include a housing and at least two engaging means for controlling power supplied to the motor and for controlling the direction of rotation of the motor output shaft. Preferably, first and second engaging means engage the first and second switches, respectively. Each toolhead housing is further arranged to accept the motor unit when operatively coupled with the toolhead. A user operable switch is included in each toolhead housing for actuating the individual toolhead, the user operable switch forming and the first engaging means.

Preferably, the first switch of the motor unit is also operable to control the rotational speed of the rotatable output shaft in order to vary the operating speed of the individual toolhead. The user operable switch of the toolhead is thus also operable for controlling the rotational speed of the motor output shaft.

Alternatively, a third switch is provided in the motor unit for turning the motor unit on and off and for varying motor speed, the third switch thus controlling rotational speed of the rotatable output shaft to vary to operating speed of the individual toolhead. There is also provided at least one additional toolhead which includes as the two engaging means thereof the second engaging means, without including the first engaging means, and a third engaging means to engage only the third switch of the motor unit in order to vary the operating speed thereof. Thus, in accordance with the invention there is provided one toolhead, such as an orbital sander, with an arrangement for controlling only an on/off function of the motor unit, when engaged therewith, and another toolhead arranged for controlling both the on/off function and the operating speed of the motor unit.

In accordance with the alternate embodiment, the second engaging means of at least one of the two toolheads includes a cam on the toolhead housing for moving the second switch of the motor to a predetermined position, thus causing the motor output shaft to rotate only in a predetermined direction when engaging that toolhead.

In this arrangement, the second engaging means of the other of the two toolheads includes a further user operable switch for selectively activating the second switch, thus for varying the rotational direction of the motor output shaft and the directional operation of the toolhead. Accordingly, in this arrangement one of the toolheads is provided with a fixed rotational direction for the motor output shaft, and another toolhead includes an operator control switch for varying the direction of rotation of the motor.

In a further aspect of the alternate embodiment of the invention, the second engaging means of at least one of the two toolheads includes a further user operable switch for selectively varying the direction of rotation of the motor output shaft.

In accordance with a different facet of the invention, there is provided a motor driven power tool assembly including a self contained electric motor unit encased in a housing. A number of control switches are provided for controlling the motor, including at least a first switch for turning the motor on and off and a second switch for turning the motor on and off as well as for controlling the rotational speed of the output shaft of the motor. A plurality of separate toolheads are each separately engagable with the motor unit. Each of the toolheads includes a driven input member and a coupling arrangement for coupling the input member to the output shaft of the motor unit. The indivudual toolheads further include at least a first engaging means for engaging one of the switches of the motor. In one toolhead the first engaging means engages the first switch and in another toolhead the first engaging means engages the second switch of the motor. Thus, in accordance with the invention the first toolhead is provided with an arrangement for controlling only an on/off supply of power to the motor when coupled thereto while the other toolhead controls both the supply of power and the speed of rotation of the motor when coupled thereto. The housing of each toolhead is further arranged to accept the motor unit therein when operatively coupled with the toolhead, and includes a user actuable switch as the first engaging means.

In accordance with this aspect of the invention, the motor unit further includes a third switch for controlling the direction of rotation of the output shaft, and each of the toolheads includes a second engaging means for engaging and controlling the third switch of the motor, thus controlling the direction of rotation of the output shaft and the direction of operation of the toolhead.

Preferably, the second engaging means for at least one of the plurality of toolheads includes a fixed cam on the housing for moving the third switch to a predetermined position, thus causing the motor output shaft to rotate only in a predetermined direction when engaging that toolhead. Still further, in a second of the toolheads the second engaging means includes a further user operable switch for selectively activating the third switch and for varying the direction of rotation of the motor output shaft and thus for varying the direction of operation of the toolhead. Accordingly, in this arrangement the first toolhead is provided with a fixed direction of rotation for the motor output shaft and the second toolhead is provided with a user operable control switch for varying the direction of rotation of the motor output shaft.

Thus, in accordance with the invention the different toolheads, when coupled with the same motor unit, provide tools which have either a variable operating speed characteristic, a fixed operating speed, and/or fixed or variable direction of operation.

The housing of the second toolhead may further include an initiating means in the second engaging means for moving the third switch of the motor to a predetermined initial position. Thus, when the toolhead is engaged by the motor unit, the user controllable direction of rotation is biased to an initial direction.

Preferably, the initiating means is provided in the form of a cam on the further user operable switch means forming the second engaging for varying the direction of operation of the toolhead.

The first mentioned toolhead may thus be an orbital sander, including a gearing arrangement to convert rotation of the output shaft of the motor to orbital motion of a sanding pad, wherein the first engaging means is a user operated switch engaging the first (on/off) switch of the motor. Alternatively, the first toolhead may be a sabre saw which includes a gearing arrangement to convert rotation of the output shaft of the motor to reciprocating movement of a saw blade, and wherein the first engaging means thereof includes a user actuated arrangement for engaging the second switch of the motor unit for turning the sabre saw on and off and for controlling reciprocating speed of the saw blade.

The second toolhead may be a drill head, including a gearing arrangement for converting rotation of the output shaft of the motor to rotation of a drill bit engaging means without a chuck, and comprising a trigger actuated drill first engaging means for engaging the second switch of the motor unit to turn the motor unit on and off and to vary the operating speed thereof. A manually operable extension is provided, forming the second engaging means of the housing, for engaging a reversing switch handle of the third switch means of the motor unit, thus controlling the rotational direction of the drill bit.

The manually operable extension preferably includes the other cam for biasing the rotational direction of drill bit to a predetermined direction when first engaging the motor unit end permitting variation of the direction by manual movement of the extension.

Other objects, features and advantages of the present invention will become readily apparent to those skilled in the art from the following description wherein there is shown and described a preferred embodiment of the invention, simply by way of illustration and not of limitation of the best mode for carrying out the invention. The invention itself is set forth in the claims appended hereto. As will be realized upon examination of the specification, the present invention is capable of still other different, embodiments and its several details are capable of modifications in various obvious aspects, all without departing from the invention which is recited in the claims. Accordingly, the drawings and the descriptions provided herein are to be regarded as illustrative in nature and not as restrictive of the invention.

BRIEF DESCRIPTION OF THE DRAWINGS

The accompanying drawings, incorporated in and forming a part of the specification, illustrate several aspects of the present invention and, together with the description, serve to explain the principles of the invention. In the drawings.

BEST MODE FOR CARRYING OUT THE INVENTION

Figure 1:
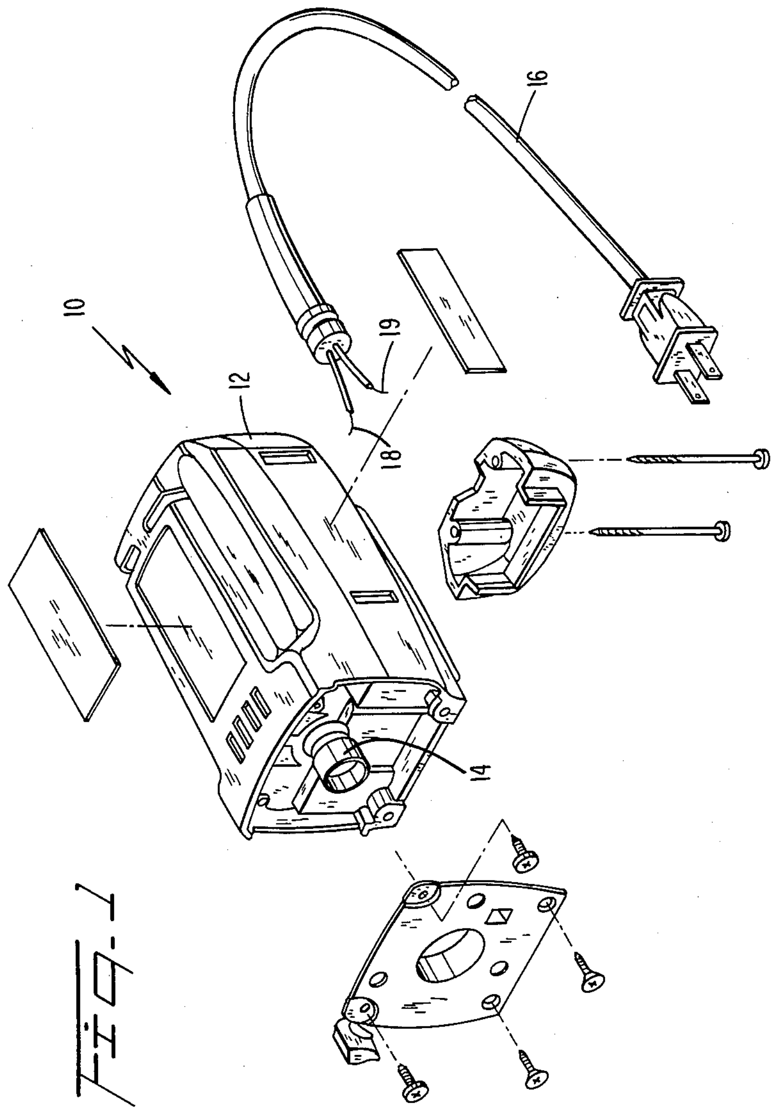
FIG. 1 shows an exploded view of a motor unit for the invention.

In accordance with the above described objects and features of the invention, there is provided a driving motor, encased in an insulated housing for attachment to any of a plurality of toolheads. An exploded view of parts of the motor unit, including therein the motor, is shown in FIG. 1, which comprises motor unit 10 for the invention. The motor unit is encased in a housing 12, preferably an insulated housing. The motor encased within housing 12 is not seen in the Figure. However, such motors are well known and do not, in themselves, form part of the invention.

A driving shaft of the motor extends from housing 12 and is terminated by a coupling gear 14. A power cord 16, separately shown in FIG. 1, is connected to the motor through a switching circuit for controlling the speed of the motor and for controlling the phase differential of various electromagnetic fields within the motor, thereby controlling the direction of rotation of the motor.

Figure 2:
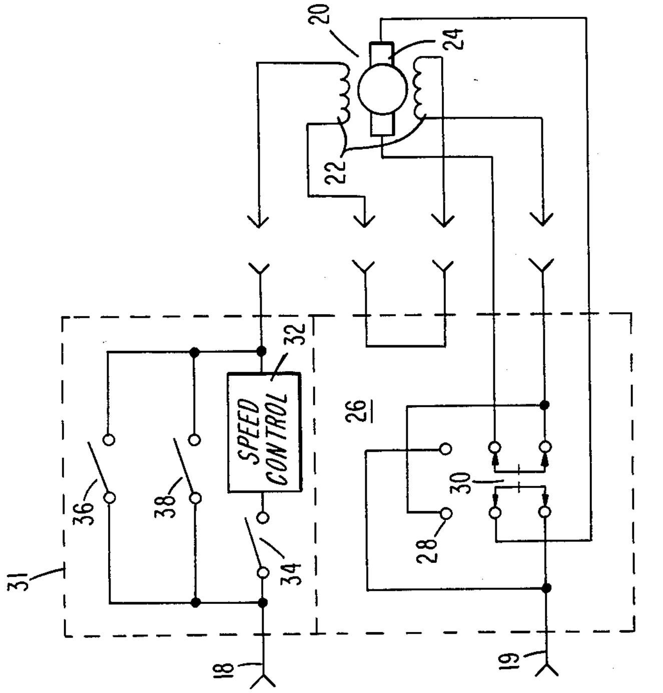
FIG. 2 is a schematic diagram for a switching circuit for the motor unit shown in FIG. 1.

At FIG. 2 there is shown a schematic diagram for the switching circuit used to control the motor. As shown therein, two line terminals 18 and 19 provided by power cord 16 supply electricity to power motor 20. The motor includes a pair of field windings 22 and an armature winding 24. A reversing switch 26 is shown in FIG. 2 including a number of poles 28 and an armature 30. The armature 30 is shown in a first position, connecting each of the left and right hand center poles to the respective left and right hand bottom poles of switch 26. Upon sliding the armature 30 to its alternate position, the center poles are connected to the respective upper poles of switch 26.

Upon review of the current path from line terminal 19 through the field and armature windings, it is seen that in the illustrated position of armature 30, positive current flow entering the motor and switching arrangement at terminal 19 passes from right to left through armature winding 24 and from left to right in both field windings 22. If the armature 30 of switch 26 is activated to its alternate position, it will be appreciated that positive current flow, entering at line terminal 19, results in current flow from left to right through the armature winding 24 and from left to right through both field windings 22, thus reversing the phase difference between the armature and field windings and reversing the direction of rotation of motor 20.

The electrical current supplied to motor 20 is controlled by an on/off and speed control arrangement, shown at 31. Therein, the current is passed through a speed control arrangement 32, which is well known in the art. It is noted, however, that a control switch 34 is provided in series with the speed control structure 32. Thus, closure of switch 34 activates motor 20 in a direction determined by switch 26 at a speed determined by the speed control circuit 32.

A separate on/off switch 36 is provided in parallel with the series combination of speed control circuit 32 and control switch 34. Thus, upon closure of switch 36, motor 20 is activated to rotate at a fixed speed in the direction determined by the setting of armature 30 of switch 26. A separate, bypass control switch 38 is provided as a safety measure for the speed control circuit 32 and and the switch 34, to provide a means for turning the motor on and off in the event of failure of either the speed control circuit or the control switch 34.

Figure 3:
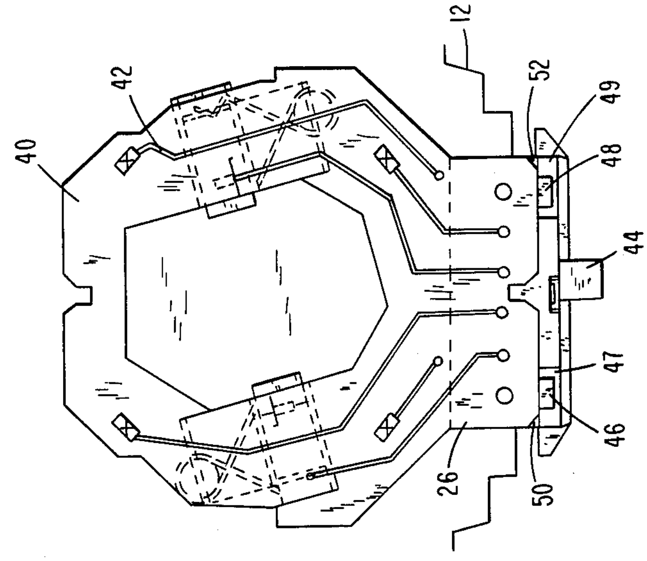
FIG. 3 illustrates a portion of the motor unit used in FIG. 1.

At FIG. 3 there is shown an end view, relative to the illustration of FIG. 1, of a wiring board portion within the housing 12. Therein, a circuit board 40 includes a wiring pattern, illustrated by printed conductors 42, for example. Conductors 42 make contact with the terminals 18 and 19 of power cord 16 and are connected to the reversing switch 26, illustrated at the bottom of the figure. As shown therein, a handle 44, connected to armature 30 of the switch 26, protrudes from the housing for providing external control of the direction of rotation of motor 20. Upon sliding of switch handle 44 to the left or right, the armature 30 is moved as above described with reference to FIG. 2.

Switch 34 and a movable control arm for speed control circuit 32 are connected to be activated by displacement of a further handle member 46. Yet another handle member 48 is shown in FIG. 3, connected to operate the armature of switch 36.

In accordance with an advantageous arrangement of the present invention, the three control switch operators of the motor arrangement are each accessible for external operation of the motor. However, handle members 46 and 48 are hidden within a pair of slots 47 and 49 formed within the housing assembly of the motor unit, thus to avoid accidentlly activating or deactivating the motor or accidently varying the operating speed thereof.

A pair of engaging grooves 50 and 52 are provided in the housing assembly for securing the motor unit 10 to mating projections provided in each of the toolheads.

Figure 4:
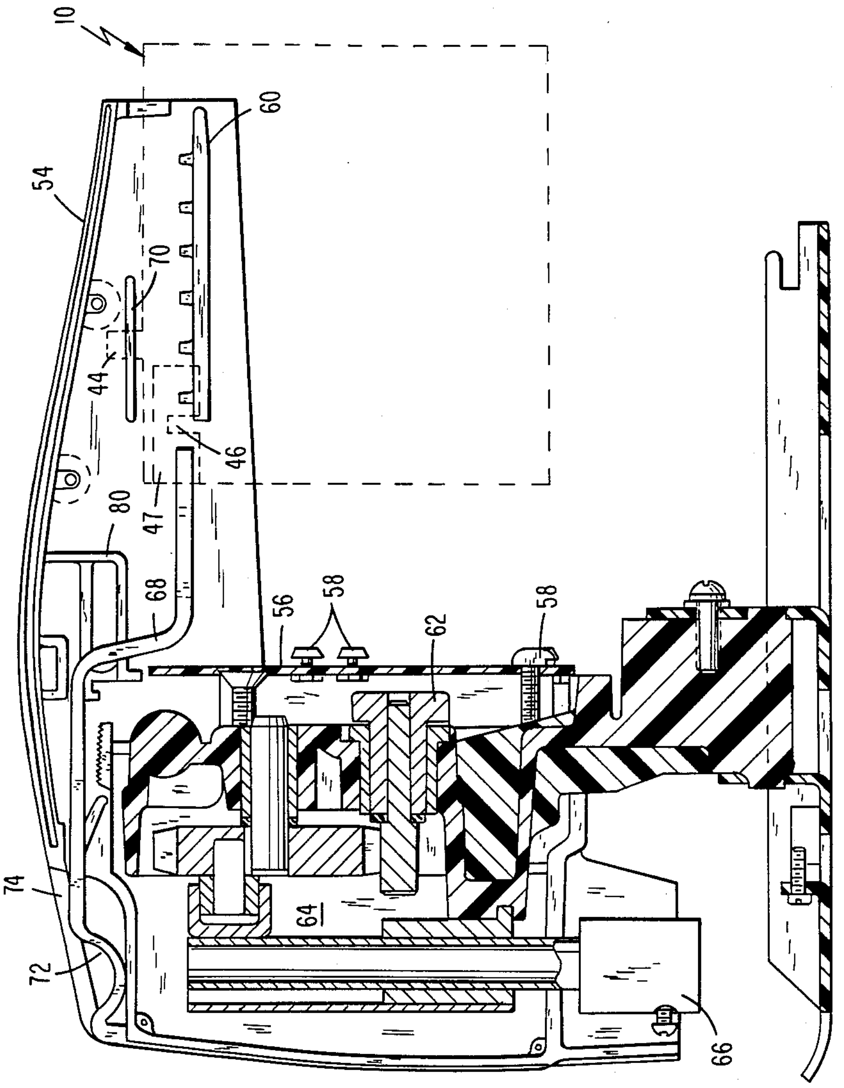
FIG. 4 shows one toolhead, a sabre saw, for use with the motor unit of the invention.

Referring now to FIG. 4 there is shown a toolhead for engaging motor unit 10 in accordance with the invention. More specifically, a toolhead incorporating an arrangement for converting the rotary motion of the output shaft of the motor to reciprocating motion for driving a sabre saw is contemplated by the structure of FIG. 4.

Referring specifically to the drawing figure illustration, a sabre saw tool comprises a housing 54, including therein an engaging plate 56 for engaging the surface of the motor unit 10. Three locking pin members 58 protrude outwardly from engaging plate 56 to engage corresponding holes provided in the surface of motor unit 10. Not shown in the drawings is a spring actuated locking plate provided within the housing 12 of motor unit 10, for engaging the grooves provided in locking pin members 58.

A projection 60 protrudes inwardly from housing 54 of the toolhead. Projection 60 mates with engaging groove 50 of the motor unit, shown in FIG. 3. A similar projection is provided on the mating half of the housing assembly for the sabre saw (not shown) for engaging groove 52. As will be appreciated by those of ordinary skill, the structure shown in FIG. 3 is rotated by 180°, to be placed "upside down", for engagement with the housing 54.

The sabre saw tool itself includes a driven member 62, provided to engage coupling gear 14 mounted to the output shaft of motor unit 10. A gearing structure 64, which may be of a type well known in the art and which does not form part of the present invention, is connected to the driven member 62 for converting rotary motion thereof to reciprocating motion of a blade engaging chuck 66.

Further, a user operable lever structure 68 engages the handle member 46 to provide on/off and speed control of the motor unit 10. It will be appreciated that movement of lever 68 in a right-left direction in FIG. 4 causes movement of handle 46 in a front-back direction in FIG. 3. A separate cammed projection 70 is provided on the interior surface of the housing 54 to move handle 44 to a predetermined position. Thus, upon engagement of the motor unit by housing 54, cam 70 causes handle 44 to move in a right-left direction relative to FIG. 3. Particularly, in the illustration of FIG. 2, handle 44 is shown in a position controlling motor 20 to operate in a reverse direction. Upon mounting of motor unit 10 within housing 54, the cammed projection 70 forces handle 44 to its other position, closer to the slot 47, thus operating reversing switch 26 to the forward position and causing motor 20 to rotate in the forward direction.

To mount the motor unit 10 within the housing 54, the motor unit is moved linearly to permit projections 60 to engage grooves 52 and 50. If the reversing switch is positioned to the "forward" position, cammed projection 70 plays no further role. If the reversing switch is in the reverse direction, cammed projection 70, which includes a ramp portion for gradually contacting and displacing handle 44, changes the position of the handle 44 and thus the position of switch 26. Upon sliding the motor unit forward, the lever structure 68 mates with slot 47 and engages handle member 46 of switch 34 and speed control circuit 32. The length of the lever structure 68 is such that when the motor unit surface is fully engaged by locking pin members 58 and is locked in connection thereto, the lever engages handle 46.

A depression 72 is provided in the lever structure 68, to permit engagement of the lever by an operator, and more particularly by the thumb of forefinger of the operator. A clearance 74 is provided in housing 54 to permit the user to move the lever portion having depression 72 therein rearwardly sufficient to cause handle 46 to operate the armature of control switch 34 and, depending on how far the lever is moved, to operate the speed control circuit 32 to a desired speed setting.

Accordingly, upon engagement of motor unit 10 by housing 54 of the sabre saw toolhead, switch 34 and speed control circuit 32 are engaged by lever 68, and cammed projection 70 biases the reversing switch 26 to cause motor rotation to be in a predetermined, forward direction.

Figure 5:
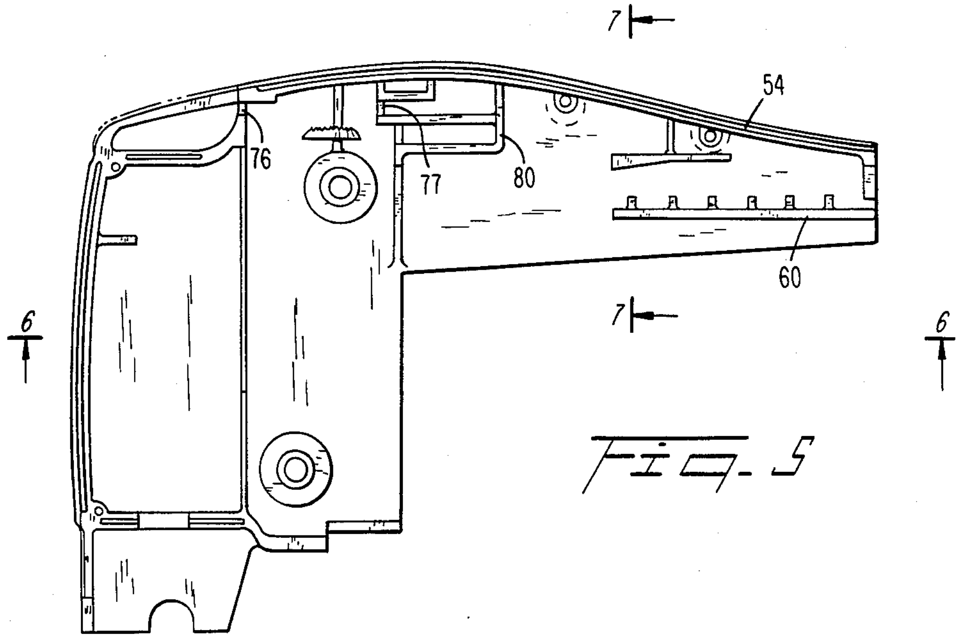
FIG. 5 illustrates an upper portion of a housing for the sabre saw of FIG. 4.

Referring now to FIG. 5, there is shown an elevational view of a molded product forming one half of the upper portion of the housing 54 for the sabre saw illustrated in FIG. 4. As seen therein, a slot 76 is provided to connect clearance 74 to a hollow portion of housing 54, thus providing passage for lever 68 to engage handle 46 for the speed control of motor 20. The leftward horizontal portion of lever 68, shown passing through slot 76, is further passed through an extension slot 77, also illustrated in FIG. 5. In a bottom view taken at lines 6—6 and illustrated at FIG. 6, a clearance area 78 is shown as providing a limited degree of movement for the vertically inclined portion of lever 68. The rear portion of clearance 78 includes an upstanding portion 80, also illustrated at FIGS. 4 and 5, preventing further rearward movement of the lever by abutment against the vertically inclined portion thereof.

Figure 6:
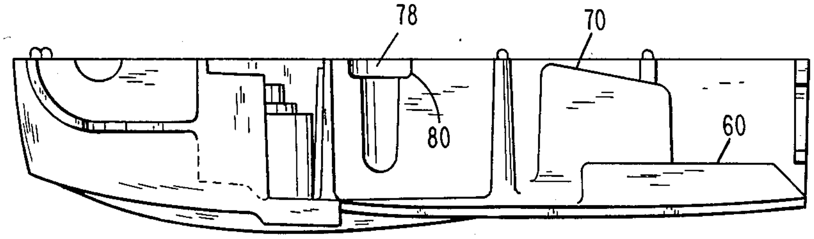
FIG. 6, is a bottom view of the housing of FIG. 5 taken along lines 6—6 thereof.

The view at FIG. 6 advantageously illustrates the ramped portion of the cammed projection 70. Thus, switch handle 44, if inclined to the reverse rotation setting, is gradually urged by the ramp portion of cam 70 towards a forward rotation setting for providing forward rotation of the motor.

Figure 7:
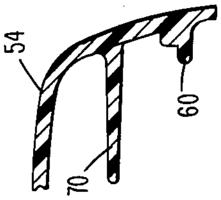
FIG. 7 is a partial sectional view of the housing, taken along lines 7—7 of FIG. 5.

FIG. 7 illustrates a partial sectional view taken at lines 7—7 of FIG. 5. The view illustrates the projection 60, which engages groove 52 in the housing of the motor unit, as well as the cam projection 70. Motor unit 10 thus rests on the shelf-like projection 60 and is supported thereby while sliding towards the engaging plate 56 for mating engagement with locking pin members 58. While sliding towards such mating engagement, cammed projection 70 gradually urges handle 44 to a fixed forward direction setting. An intermediate position of motor unit 10, while sliding towards engagement with engaging plate 56, is shown in phantom in FIG. 4.

Figure 8:
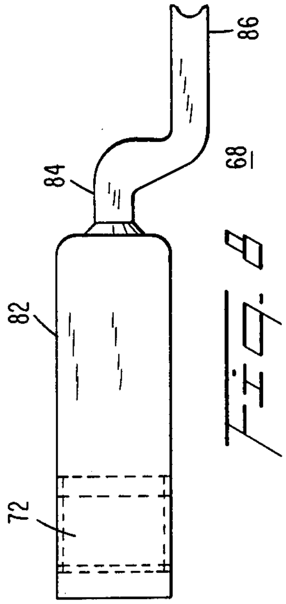
FIG. 8 shows a top view of a control lever used in the housing of FIG. 4.
Figure 9:
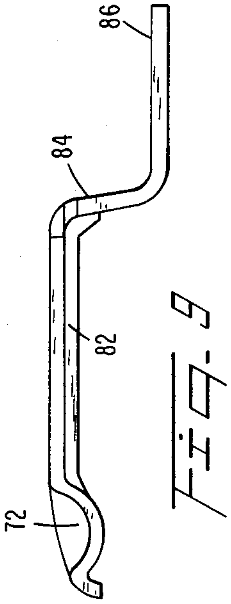
FIG. 9 is an elevational view of the lever of FIG. 8.

FIGS. 8 and 9 show top and elevational views, respectively, of the user operable lever 68 illustrated in FIG. 4. As noted in FIG. 8, lever 68 includes a user engagable portion 82, having therein depression 72, and intermediate extension 84 passing through slot 76 and extension slot 77. The intermediate extension 84 is connected to a rightwardly offset portion 86, including a hollowed engaging end for a cylindrical post forming the further handle member 46 of the speed control switch. It will be appreciated that the hollowed engaging end could be offset to the left of intermediate extension 84, rather than to the right as shown in FIG. 8. Such a leftward extension would permit the engaging end to engage a similar cylindrical post forming the handle member 48, which controls on/off switch 36. It is thus seen that by providing an appropriate number of control switches on the motor unit 10, and by further providing proper engaging levers, the operating characteristics of the motor unit may be made to appear different when utilized with different toolheads.

As will be illustrated in the following description, a modified engaging structure is used with a drill toolhead and housing to mount the motor unit thereto without providing the cammed projection 70. Instead, there is provided a further user operable arrangement for displacing the handle 44 and thus for operating the reversing switch 26. The arrangement or engaging the motor unit to the drill toolhead thus provides user operation of both the on/off switch 34 and speed control circuit 32 and the reversing switch 26. In yet a further variation of the housing provided to a different toolhead, an orbital sander is described wherein a single user operable lever structure is provided, for engaging handle member 48, together with a cammed structure to provide a predetermined setting for the reversing switch 26. Thus, in this arrangement user control is provided for on/off switch 36, while speed control circuit 32 is not engaged and reversing switch 36 is automatically controlled to a predetermined (forward) direction.

Figure 10:
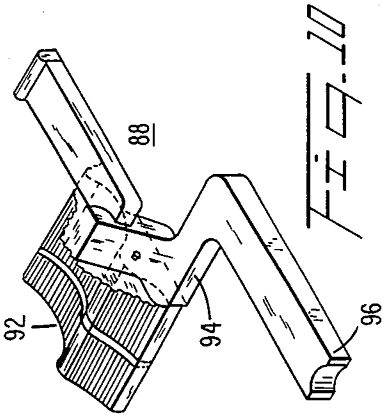
FIG. 10 is an isometric view of a different user operable lever for a separate toolhead to be used with the motor unit of the invention.

Accordingly, referring now to FIG. 10 there is shown a different user operable lever, generally identified by reference numeral 88 and applicable for use in an orbital sander toolhead, for example. The function performed by lever 88 is substantially identical to the function performed by lever structure 68 shown in FIG. 4, for example. Thus, there is provided a user engagable portion 92, including a thumb engagable depression therein and having frictionally serrated surface for slipproof engagement. An intermediate portion 94 connects the user engagable portion to an offset extension 96, having a hollowed engaging end for the appropriate switch handle post. The offset extension, when viewed from the user engagable portion, is offset to the left, while the offset extension of lever 68 is offset to the right. Thus, extension 96 engages handle 48 for the armature of on/off switch 36.

Figure 12:
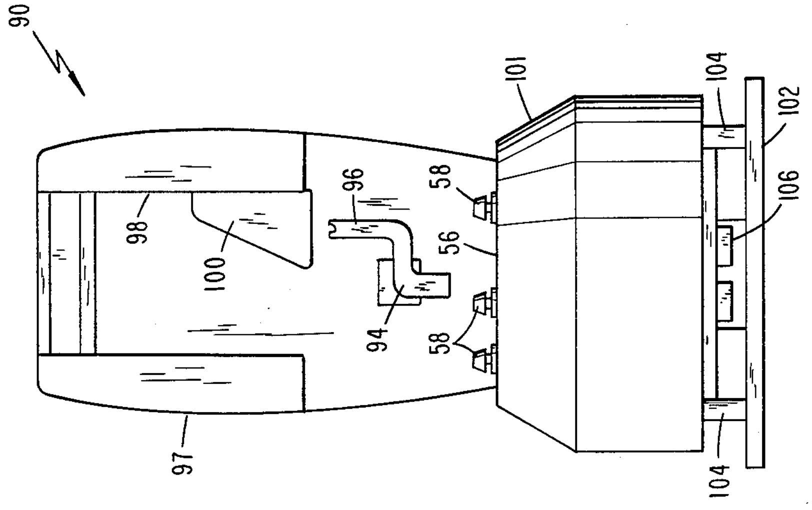
FIG. 12 is a housing for an orbital sander toolhead, including the lever of FIGS. 10 and 11.

In accordance with the invention, the housing of the orbital sander, or any other tool, is significant in providing an appropriate location for the lever 88, and for an engaging plate for the surface of the motor unit similar to engaging plate 56 of the sabre saw and including therein locking pin members 58. The housing 90 illustrated in FIG. 12 emphasizes the above features. Particularly, shelves 97 and 98 are shown projecting inwardly to the housing, similarly to projection 60 for the housing of FIG. 4. A fixed cam 100 is included in the housing to bias the reversing switch handle 44 to the forward direction. Lever 88 is shown, including particularly the intermediate portion thereof 94, protruding through a slot provided in the housing.

Figure 11:
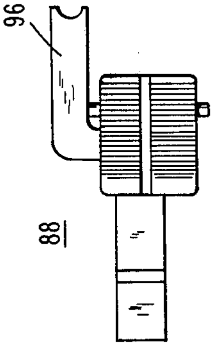
FIG. 11 is a top view of the lever of FIG. 10.

In a bottom view relative to FIGS. 10 and 11, offset extension 96 thus projects in a direction opposite to that of the lever 68 to engage the appropriate one of the two control switches of the motor unit. An engaging plate 56, substantially identical to the engaging plate for the sabre saw toolhead, is provided, including therein locking pin members 58. In an enclosed portion 101 of housing 90 there is provided a gearing structure for converting the rotational movement of the output shaft of the motor to orbital movement of a sanding pad attached to a mounting plate 102 therefor. The mounting plate is attached by flexible mounts 104 to housing 90 and the final portion of the gearing structure used to convert the rotary motion to orbital motion is illustrated at 106.

Figure 13:
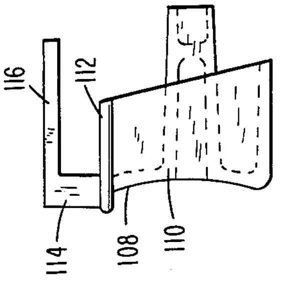
FIG. 13 is an elevational view of a user operable trigger lever for a drill toolhead to be used for the invention.

Referring to FIG. 13, there is shown yet another user operable lever, shaped in the form of a trigger, for use in conjunction with a housing for a drill head to be used in conjunction with the invention. Thus, there is provided a trigger portion 108, having a curved surface 110 for easy digital engagement. To a platform 112 is connected an intermdiate member 114, from which extends an offset portion 116, terminating in a hollowed out portion for engaging a post forming the handle member 46 of the speed control switch for speed control circuit 32. A top view of the trigger control lever is shown in FIG. 14.

Figure 14:
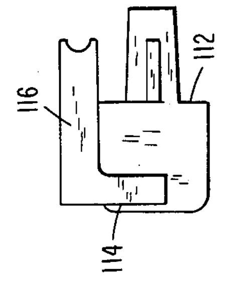
FIG. 14 is a top view of the lever shown in FIG. 13.

It should be recognized that the "top" view shown in FIG. 14 corresponds to a "bottom" view of the lever shown in FIG. 9. Thus, viewed from the trigger side, offset portion 116 includes an offset to the right, such as shown at FIG. 8 for user operable lever 68 of the sabre saw. Accordingly, both the sabre saw toolhead and a drill toolhead utilizing the trigger type lever of FIGS. 13 and 14 provide user control of operating speed.

Figure 15:
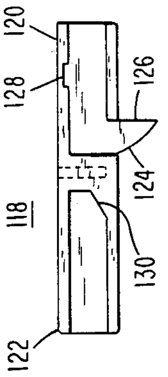
FIG. 15 is a top view of an additional lever for controlling direction of rotation for a drill head used in the invention.

In that regard, there is further provided in a drill toolhead to be used in conjunction with the motor unit of FIG. 1, and additional operator activated lever. The additional lever is operable for setting to desired operating positions handle member 44, connected to reversing switch 26, thereby to control the operating direction of the motor and of a drill bit driven by the toolhead. FIG. 15 shows a top view of the additional direction controlling lever provided for the drill head, taken from the same perspective as the top view of the trigger shown in FIG. 14. As shown in FIG. 15, the direction controlling lever, generally shown at 118, includes first and second lateral portions 120 and 122. The ends of the lateral portions protrude from the drill head housing for engagement by the user. First lateral portion 120 includes a transverse portion, having a biasing cam 124 at a forward edge and a transverse rear edge 126. A small projection 128 is provided on the first lateral portion 120. A second cammed surface 130 is provided on the second lateral portion 122.

Figure 16:
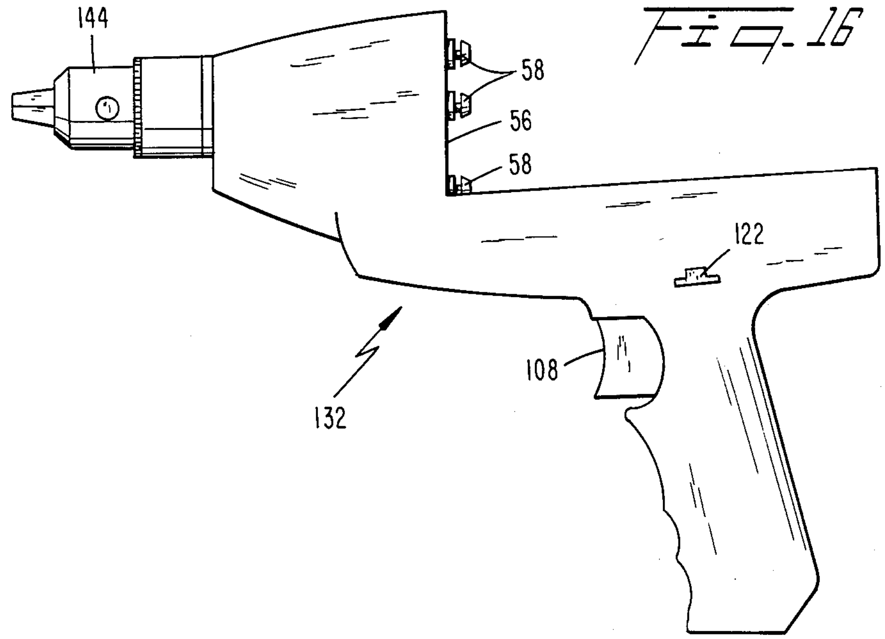
FIG. 16 is an elevational view of a housing for a drill head in accordance with the invention.
Figure 17:
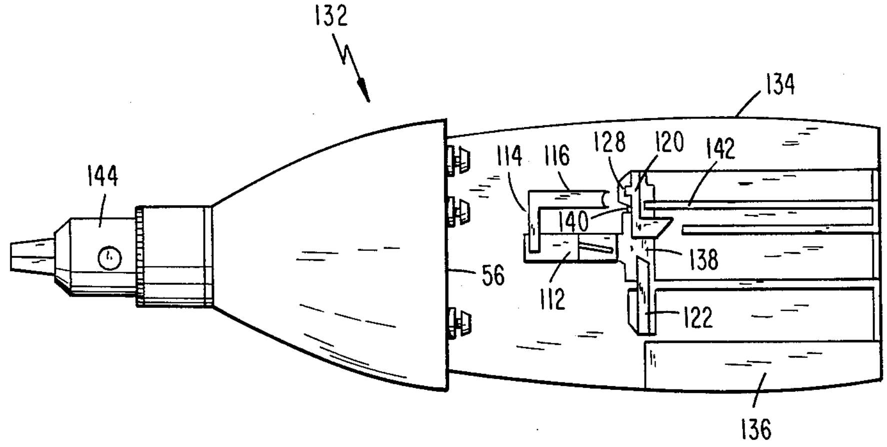
FIG. 17 is a top view of the drill head housing of FIG. 16.

FIG. 16 illustrates an elevational view of a housing for a drill head in accordance with the present invention, while FIG. 17 shows a top view of the structure of FIG. 16.

Particularly, the housing for the drill head, generally shown at 132, includes both the trigger activated structure for engaging the speed control switch and the direction controlling lever. At FIG. 16 trigger portion 108 is seen as protruding forwardly from the housing 132, and the second lateral portion 122 of direction controlling lever 118 is seen to protrude through an opening provided in the side of housing 132. The top view of the drill head housing, shown at FIG. 17, includes shelves 134 and 136 for engaging slots 50 and 52. Upon comparison of FIGS. 12 and 17, it is seen that offset portion 116 provided in the drill housing is offset to the left in order to engage handle member 46, thus to control the speed control circuit 32, as opposed to the offset portion 96 provided for the orbital sander, which is offset to the right in order to engage handle member 48 to provide on/off control without speed control.

A further point of differentiation between the housings illustrated at FIG. 2 and FIG. 17 is the absence of the cam 100 from the drill head housing. Thus, in contrast the housings used for the sabre saw and orbital sander toolheads, housing 132 does not provide a fixed portion for handle member 44 and for the direction of rotation of the output shaft of motor 20. Instead, handle member 44 is engaged by the direction controlling lever 118 in a space 138 between the first and second lateral portions 120 and 122. As hereinabove indicated, the lateral portions 120 and 122 protrude through openings provided in housing 132, so that a user may displace the lever 118 transversely by using a thumb or forefinger. Upon such displacement the handle 44 is moved to one side or another, thus sliding armature 30 of reversing switch 26 between the two operative positions thereof and reversibly controlling the direction of rotation of motor 20.

Advantageously, movement of lever 118 is limited. Housing 132 includes a limit stop 140 for the small projection 128 of lever 118. A second limit stop is provided in the form of projection 142, which provides an abutment for the transverse rear edge 126. Accordingly, travel of lever 118 is limited by interactions of projections 140 and 142 with the projection 128 and the surface 126 of the lever.

In operation, upon sliding engagement of the motor unit 10 and housing 132, the cammed surfaces 124 and 130 provided on the lever may engage the handle 44. A gradual curvature is provided to the command surface 124. Thus, if direction control lever 118 is placed in a "reverse" direction (displaced downwardly in FIG. 17) handle 44, acting as a cam follower, operates reversing switch 26 to the reverse direction. If the switch is already in the reverse direction, or if both lever 118 and switch 26 are in the forward direction, displacement of the reversing switch does not take place. However, if the lever 118 is in the forward direction, and reversing switch 26 (and handle 44 thereof) are in the reverse position, the second cammed surface 130, providing a more abrupt linear cam, does not displace the switch but is, instead, displaced itself so that the lever 118 is moved to the reverse direction.

Upon locking engagement of the motor unit with the housing 132 rotation of the output shaft of motor 20, in a direction determined by lever 118 and at a speed determined by trigger 108, is coupled to a driven member (not shown) and, via a gearing arrangement, transferred to a drill bit engaged by a chuck 144 which may be said to be the last stage of the gearing structure. Accordingly, it is seen that two of the three control switches of the motor unit are controllably engaged by the drill housing, and that the reversing switch is biased to one direction if the control lever therefor is set to that direction. However, the bias is not a permanent fixing of the reversing switch, as provided by the cams 70 and 100 in the respective sabre saw and orbital sander toolhead housing embodiments.

There has thus been described and illustrated an inventive assembly of toolheads with a single motor unit, each of the toolheads including engaging means for engaging a plurality of control switches of the motor unit. Some of the engaging means are controllable and others may be fixed to provide a predetermined setting for the control switches. Advantageously, a single type of engaging plate is used to mount the motor unit to the various housings. The described arrangements permits a single motor unit to operate as a motor having characteristics of: fixed speed, fixed direction; fixed speed, variable direction; variable speed, fixed direction and variable speed, variable direction, depending on the arrangement of the engagement structure provided in the respective toolhead housings.

The foregoing description of the preferred embodiment of the invention has been presented for purposes of illustration and description and is not intended to be exhaustive or to limit the invention to the precise forms discloseed, since many obvious modifications and variations are possible in the light of the above teaching. The embodiment was chosen and described in order best to explain the principles of the invention and its practical application, thereby to enable others skilled in the art best to utilize the invention in various embodiments and with various modifications as are suited to the particular use contemplated. It is intended that the scope of the invention be defined by the claims appended hereto, when interpreted in accordance with the full breadth to which they are fairly and legally entitled.

What is claimed is:

1. A motor driven power tool assembly comprising:
- a self contained electric motor unit and a housing encasing said motor unit;
- said motor unit having a rotatable output shaft for providing output power, a plurality of control switch means for controlling said motor, including at least first switch means for turning said motor on and off, and second switch means for controlling direction of rotation of said output shaft; and
- a plurality of separate toolheads separately engagable with said motor unit;
- each toolhead including a driven input member and coupling means for coupling said input member to said output shaft of said motor unit, a housing, and at least first and second engaging means for respectively engaging said first and second switch means for controlling supply of power to said motor and for controlling direction of rotation of said output shaft of said motor;
- said housing of each individual toohead arranged for accepting therein said motor unit encased in said housing therefor when operatively coupled to said toolhead;
- said housing of each toolhead including user operable switch means forming said first engaging means for selectively turning said motor on and off thereby to control the actuation of said individual toolhead.

2. A motor driven power tool assembly as recited in claim 1 wherein said first switch means of said motor unit is further operable for controlling rotational speed of said rotatable output shaft and said user operable switch means of said toolhead is further operable to engage said first switch means to control the operating speed of said individual toolhead.

3. A motor driven power tool assembly as recited in claim 1 wherein said motor unit further comprises separate third switch means for turning said motor unit on and off, said third switch means of said motor unit being further operable for controlling rotational speed of said rotatable output shaft for varying operating speed of said individual toolhead, wherein one toolhead includes said first engaging means for engaging said first switch means, for actuating said individual toolhead, wherein at least another toolhead includes only said second engaging means, exclusively of said first engaging means, and a third engaging means for engaging only said third switch means of said motor unit for varying the operating speed thereof, thereby providing said first mentioned one toolhead with means for controlling only an on-off function of said motor unit when engaging said motor unit and said second mentioned other toolhead with means for controlling both an on-off function and operating speed of said motor unit when engaged therewith.

4. A motor driven power tool assembly as recited in claim 3 wherein said second engaging means of at least one of said first mentioned and said another toolheads comprises cam means on said housing thereof for moving said second switch means to a predetermined position, thereby causing said motor output shaft to rotate only in a predetermined direction when engaging said toolhead.

5. A motor driven power tool assembly as recited in claim 4 wherein said second engaging means of the other of said first mentioned and said another toolheads comprises further user operable switch means for selectably activating said second switch means and for varying a direction of rotation of said motor output shaft and varying a direction of operatin of said toolhead, thereby providing said one of said toolheads with a fixed direction of rotation for said motor output shaft and providing for the other of said toolheads an operator control switch for varying the direction of rotation for said motor output shaft.

6. A motor driven power tool assembly as recited in claim 3 wherein said second engaging means of at least one of said first mentioned and said another toolheads comprises further user operable switch means for selectably activating said second switch means and for varying a direction of rotation of said motor output shaft and varying a direction of operation of said toolhead.

7. A motor driven power tool assembly comprising:

a self contained electric motor unit and a housing encasing said motor unit;

said motor unit having a rotatable output shaft for providing output power, a plurality of control switch means for controlling said motor, including at least first switch means for turning said motor on and off, and second switch means for turning said motor on and off and for controlling speed of rotation of said output shaft; and a plurality of separate toolheads separately engagable with said motor unit;

each toolhead including a driven input member and coupling means for coupling said input member to said output shaft of said motor unit, a housing, and at least first engaging means for engaging one of said first and second switch means, at least one toolhead having a first engaging means engaging said first switch means and at least another toolhead having a first engaging means engaging said second switch means, thereby providing said at least one toolhead with means for controlling only an on-off supply of power to said motor unit when coupled thereto and said at least another toolhead with means for controlling both supply of power and speed of rotation of said motor unit when coupled thereto, said housing of each individual toolhead arranged for accepting therein said motor unit encased in said housing therefor when operatively coupled with said toolhead;

said housing of each toolhead including user actuatable switch means forming said first engaging means.

8. A motor driven power tool assembly as recited in claim 7 wherein said motor unit further comprises third switch means for controlling direction of rotation of said output shaft, each toolhead comprising second engaging means for engaging and controlling said third switch means thereby controlling direction of rotation of said output shaft and direction of operation of said toolhead.

9. A motor driven power tool assembly as recited in claim 8 wherein said second engaging means of at least a first of said plurality of toolheads comprises cam means on said housing thereof for moving said third switch means to a predetermined position, thereby causing said motor output shaft to rotate only in a predetermined direction when engaging said first toolhead.

10. A motor driven power tool assembly as recited in claim 9 wherein said second engaging means of at least a second of said plurality of toolheads comprises further user operable switch means for selectably activating said third switch means and for varying a direction of rotation of said motor output shaft and varying a direction of operation of said toolhead.

thereby providing said first of said toolheads with a fixed direction of rotation for said motior output shaft and providing for said second of said toolheads a user operable control switch for varying the direction of rotation for said motor output shaft.

11. A motor driven power tool assembly as recited in claim 10 wherein said second toolhead further comprises initiating means for moving the third switch means of the motor unit to a first position prior to engaging the second engaging means of said toolhead housing.

12. A motor driven power tool assembly as recited in claim 11 wherein said initiating means comprises a futher cam means, said further cam means provided on said further user operable switch means varying the direction of operation of said toolhead.

13. A motor driven power tool assembly as recited in claim 12 wherein said second toolhead comprises a drill head, including a gearing structure for converting rotation of the output shaft of said motor unit to rotation of a drill bit engaging means within a chuck, a trigger actuated engaging means for engaging said second switch means of said motor unit thereby turning the motor unit on and off and controlling rotational speed of the drill bit, and a manually operable extension forming said second engaging means for for engaging a reversing switch handle of the third switch means of said motor unit for controlling rotational direction of the drill bit.

14. A motor driven power tool assembly as recited in claim 13 wherein said manually operable extension includes said further cam for biasing said third switch means to said first position and setting the rotational direction of the drill bit to a predetermined direction when engaging said motor unit.

15. A motor driven power tool assembly as recited in claim 13 wherein said first toolhead comprises an orbital sander including a gearing structure for converting rotation of the output shaft of said motor unit to orbital displacement of a pad, said first engaging means of said first toolhead including a manually operable lever for engaging said first switch means of said motor unit for turning the motor unit on and off.

16. A motor driven power tool assembly as recited in claim 9 wherein said first toolhead comprises an orbital sander including a gearing structure for converting rotation of the output shaft of said motor unit to orbital displacement of a pad, said first engaging means of said first toolhead including a manually operable lever for engaging said first switch means of said motor unit for turning the motor unit on and off.

17. A motor driven power tool assembly as recited in claim 9 wherein said first toolhead comprises a sabre saw including a gearing structure for converting rotation of the output shaft of said motor unit to reciprocating movement of a saw blade, said first engaging means of said first toolhead comprising a trigger actuated engaging means for engaging said second switch means of said motor unit for turning the sabre saw on and off and for controlling reciprocating speed of the saw blade.

18. A motor driven power tool assembly as recited in claim 17 wherein said second engaging means of at least a second of said plurality of toolheads comprises further user operable switch means for selectably activating said third switch means and for varying a direction of rotation of said motor output shaft and varying a direction of operation of said toolhead, wherein said second toolhead comprises a drill head, including a gearing structure for converting rotation of the output shaft of said motor unit to rotation of a drill bit engaging means within a chuck, a trigger actuated engaging means engaging said second switch means of said motor unit thereby turning the motor unit on and off and controlling rotational speed of the drill bit, and a manually operable extension forming said second engaging means for engaging a reversing switch handle of the third switch means of said motor unit for controlling rotational direction of the drill bit.

19. A motor driven power tool assembly as recited in claim 18 wherein another of said plurality of toolheads comprises an orbital sander including a gearing structure for converting rotation of the output shaft of said motor unit to orbital displacement of a pad, said first engaging means for said another toolhead including a manually operable lever for engaging said first switch means of said motor unit for turning the motor unit on and off.

20. A motor driven power tool assembly as recited in claim 17 wherein another of said plurality of toolheads comprises an orbital sander including a gearing structure for converting rotation of the output shaft of said motor unit to orbital displacement of a pad, said first engaging means of said first toolhead including a manually operable lever for engaging said first switch means of said motor unit for turning the motor unit on and off.

* * * * *